(12) United States Patent
Moody

(10) Patent No.: US 6,372,129 B1
(45) Date of Patent: Apr. 16, 2002

(54) CLEANING GREASE AND OILS FROM WASTE STREAMS

(76) Inventor: Steven R. Moody, 801 Skyway Ct., Lakeland, FL (US) 33803

( * ) Notice: Subject to any disclaimer, the term of this patent is extended or adjusted under 35 U.S.C. 154(b) by 0 days.

(21) Appl. No.: 09/655,017

(22) Filed: Sep. 5, 2000

Related U.S. Application Data

(62) Division of application No. 09/314,295, filed on May 19, 1999, now Pat. No. 6,168,723.

(51) Int. Cl.$^7$ .............................. C02F 1/02; B01D 36/04
(52) U.S. Cl. ........................ 210/181; 210/182; 210/258; 210/259; 210/295; 210/513; 62/430; 62/434
(58) Field of Search ........................... 62/331, 118, 430, 62/434; 210/175, 181, 182, 195.1, 196, 167, DIG. 8, 252, 258, 259, 295, 513

(56) References Cited

U.S. PATENT DOCUMENTS 4,018,583 A * 4/1977 Patnode et al. ................ 62/115
5,093,773 A * 3/1992 Blevins ....................... 364/143
5,293,759 A * 3/1994 Lee et al.
5,429,179 A * 7/1995 Klausing .................... 62/238.7
6,168,723 B1 * 1/2001 Moody ......................... 210/774

* cited by examiner

Primary Examiner—Robert J. Popovics
(74) Attorney, Agent, or Firm—B. G. Colley

(57) ABSTRACT

A process and apparatus for effecting the recovery of grease and oils from an aqueous waste stream is disclosed. This is accomplished by a combination of steps which include removing coarse food solids from the waste stream, allowing the oils to separate from the water in a separation zone, removing the oil layer to a storage zone, removing the water layer to a heat recovery zone and transferring heat values from the recovery zone to the separation zone with vapor compression refrigeration. The invention saves energy by recycling the heat of the kitchen waste stream to the separation zone. The recovered oil is useful as a marketable product that can be converted into many useful products. When a fines filter is used in the process, the discharged water can be used for non-agricultural uses such as lawn watering or can be used in water closets and urinals.

4 Claims, 2 Drawing Sheets a new unit. A further advantage of the present invention is that the heat values of the kitchen waste stream are retained by the use of a Rankine cycle heat recovery system and thus, there is a saving in the energy bill for the user.

CLEANING GREASE AND OILS FROM WASTE STREAMS

CROSS-REFERENCE TO RELATED APPLICATIONS

This application is a division of Ser. No.: 09/314,295 filed May 19, 1999 now U.S. Pat. No. 6,168,723 B1.

BACKGROUND OF THE INVENTION

The conventional method of recovery of grease and oils from waste streams such as kitchen waste streams is that of using manual labor to-scrape and carry solids, oils, fats and greases from the cooking area to a container where the material is removed by others for direct rendering. Where fryers are used in large quantities, such as the cooking of French fried potatoes, the fryer oil is filtered and cleaned daily and the removed material is manually carried to a recovery tank for pick-up or collection. In the best of operations, a certain amount of solids, oils, fats, and greases contaminate the waste water stream.

Since municipal sewage treatment plants are not equipped to process these contaminants, all restaurants and the like are required to install a grease trap. This is reasonably effective if the residue is removed on a regular basis by pumping. Some establishments also utilize special organisms, which are put into the grease trap to break down the oils, and greases and minimize the impact of any escape of oils, fats, and greases from the grease trap to the downstream plant. Many cities and towns are beginning to recognize the detrimental impact of virtually any oil and grease into the treatment plant and are requiring more extensive removal of fats and oils or they are levying stiff fines for excessive amounts of these contaminates. The primary effect of these fats and oils is reduced capacity of the treatment plant and excessive cleaning of the waste water treatment plant which results in excessive cost and treatment time to process the entire waste water stream.

It has long been recognized that the plants and systems now in use are inadequate to properly remove solids, oils, fats, and greases from waste water streams. Employees of these plants must be properly supervised to minimize the inclusion of solids, oils, fats, and greases in the waste stream in an area where such supervision may be necessary for other more important operations and, consequently, there is less supervision of the former. Grease traps and oil removal traps must be pumped and maintained on a regular basis to operate properly and such proper maintenance is usually rare since the definition of "regular" is difficult to define.

In the prior art, various attempts have been made to address the problems set forth above. Examples of the known prior art patents are U.S. Pat. No. 4,113,617 U.S. Pat. No. 5,133,8871 U.S. Pat. No. 5,178,754 U.S. Pat. No. 5,225,085 and U.S. Pat. No. 5,504,538. These patents all show methods and or apparatus for the removal of oils and greases from kitchen waste streams but they involve the use of large fixed tanks. They are energy inefficient in that they require the addition of heat to melt or keep the oil or grease in a liquid phase.

In contrast to the prior art, the present invention can be mounted on a frame or a skid. It will have the approximate dimensions of 8 feet long by 4 feet wide and 6 feet high and thus it will take up a floor space of only about 32 square feet. Due to the above economy in floor space and the weight of about 700 pounds, the invention can be easily transported by a fork lift truck to the restaurant for installation. In the event major repairs are needed, the unit can be easily replaced with a new unit. A further advantage of the present invention is that the heat values of the kitchen waste stream are retained by the use of a Rankine cycle heat recovery system and thus, there is a saving in the energy bill for the user.

SUMMARY OF THE INVENTION

The invention comprises a process and apparatus for the recovery of oils from kitchen waste streams that contain water, oils, and food solids. The steps in the process are (a) removal of coarse food solids from said waste streams in a filtration zone, (b) separtion of the oils from the water in a separation zone at a temperature range and for a time period sufficient to produce a layer of oils and a layer of water, (c) removal of said layer of oils from the separation zone to a oil storage zone, (d) removal of water from said separation zone to a heat recovery zone, (e) transfer of heat values from said recovery zone to said separation zone with vapor compression refrigeration.

BRIEF DESCRIPTION OF THE DRAWINGS

The drawing is in two parts i.e.

FIG. 1 shows the flow of the kitchen waste stream into the surge tank, separation tank and heat recovery tank.

FIG. 2 shows the interconnection of the condenser tank, evaporator tank, refrigerant tank, refrigerant compressor, oil tank and the computer.

DETAILED DESCRIPTION OF THE INVENTION

Figure 1:
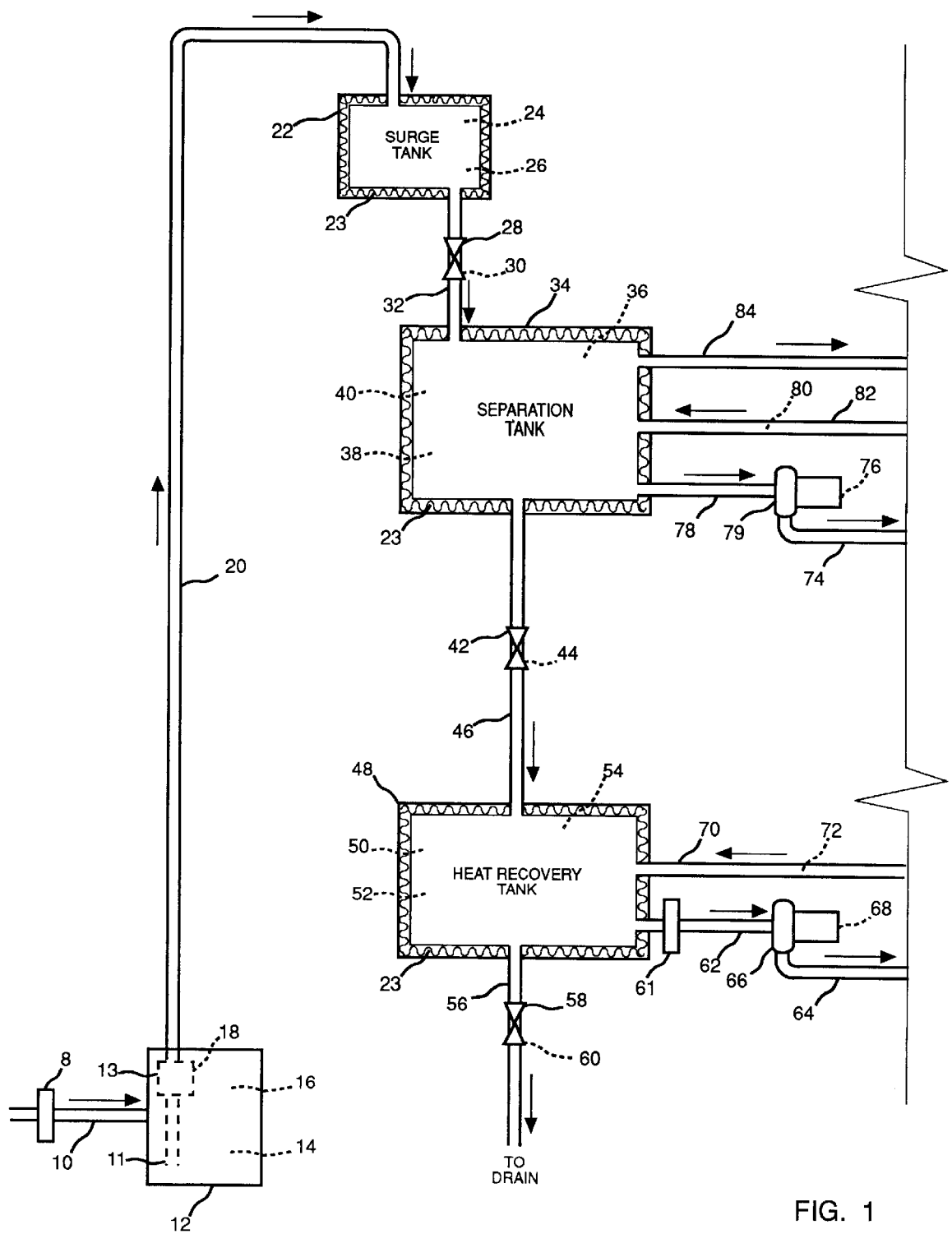
FIG. 1 and FIG. 2. In each Figure, the tanks are shown in a partial cross-sectional view to better illustrate the liquid flow and the tank insulation.
Figure 2:
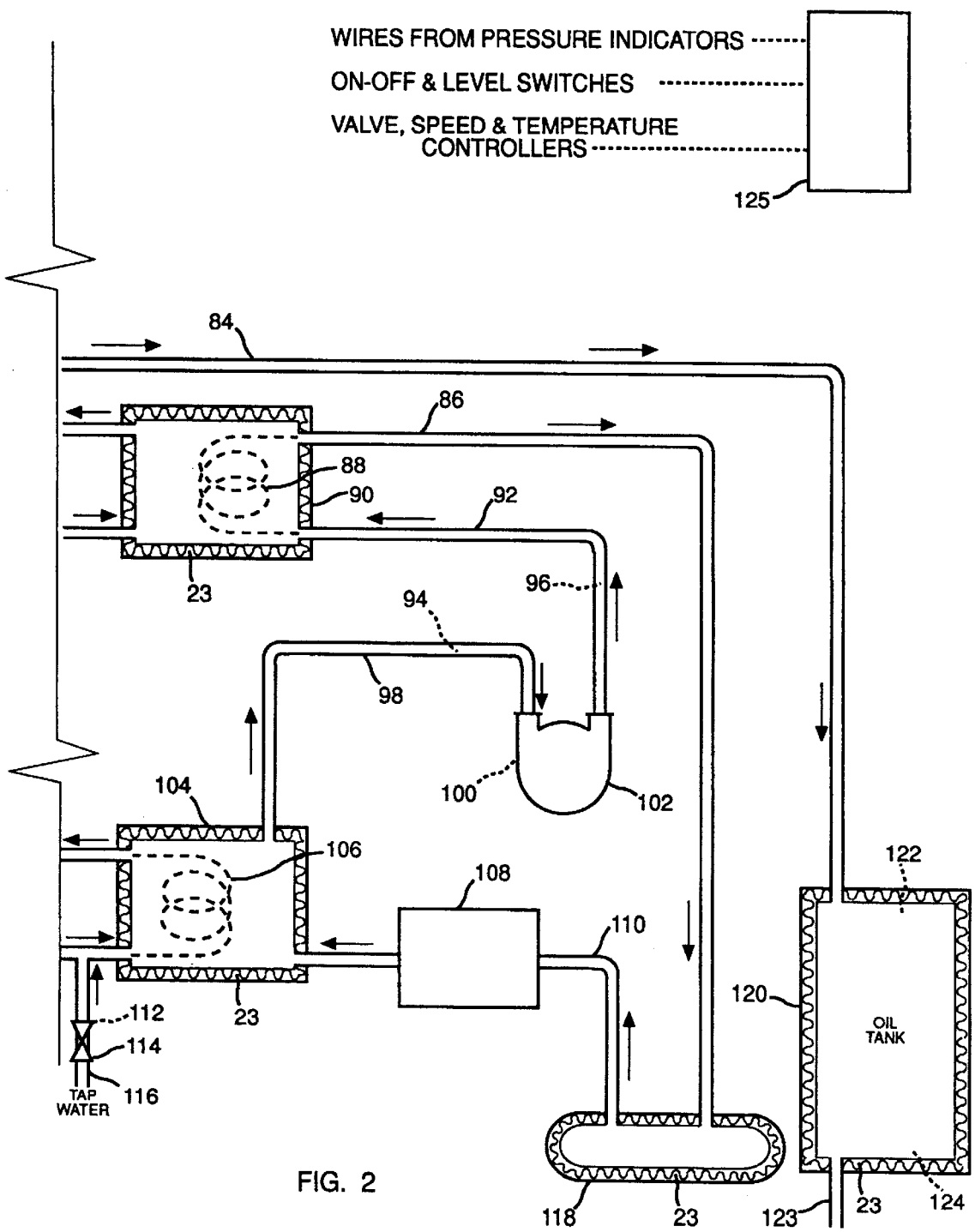

The wastewater drain 10 exiting the kitchen or other facility is filtered by a coarse filter 8 to remove large solid food particles. For the purposes of this invention, a coarse filter is one that blocks the passage of food particles greater than 0.065 inch. Examples of suitable mesh filters are those with an opening of about 0.065 inch or a 10×10 or a 12×12 wire mesh. Thus, food particles larger than about 0.065 inch are retained and/or diverted. The filtered wastewater is fed to a holding tank 12 located in the floor of the kitchen or just outside the kitchen. The level of the wastewater in the tank 12 is controlled by an internal low lever sensor connected to wire 14, which controls the transfer pump 13. The high level in the tank 12 is monitored by an internal sensor connected to wire 16 and activates a warning light in the computer 125.

In order to keep the drawings clear and neat, dotted lead lines are used with the internal sensors connected to wires or leads 14 and 16 and with other electrical connections throughout the specification to indicate that the part or element with the dotted lead is in fact connected to the computer 125.

The wastewater containing oils, fats, and greases are then pumped by means of pump 13 with its inlet pipe 11 through a pipe 20 to a surge tank 22 for transfer to the removal process. The tank 22 has internal sensors that control the high level and low level of the waste stream in the tank. These sensors are connected to wires 24 and 26, which are connected to the computer 125 as shown in section 2 of the drawing.

In the process, the wastewater is transferred by gravity through the pipe 32 and valve 28 to the separation tank 34. The valve 28 is regulated or controlled by the electrical connection or wire 30.

It is to be noted that the surge tank 22, separation tank 34, heat recovery tank 48, condenser tank 90, evaporator tank 104, storage tank 118, and oil tank 120 all have one or more layers of insulation 23 to retain the desired heat values.

The water in the separation tank 34 is allowed to set or stagnate for a period in the range from 5 minutes to 60 minutes and at a temperature in the range from 130° to 180° F. Preferably, the temperature is kept in the range from 140° F. to 170° F. and the separation time period is in the range from 15 to 50 minutes. The temperature of the tank 34 is monitored by wire 36 connected to an internal sensor in the tank. During the time period, the oils, fats, and greases rise to the surface since they are less dense than the water. Depending upon the concentrations and types of incoming oils, fats, and greases, the holding temperature can be varied within the above ranges. At the end of the separation time period, the water is drained from the tank.

Level sensors located inside the tank 34 determine the high level and low level oil/water interface and allow only water to drain from the tank and allow the oil to remain in the separation tank. Wires 38 and 40 connect the computer 125 to these sensors. As the oil accumulates, the oil layer at the top of the tank 34 becomes higher. At some point, the oil layer in the tank is of sufficient height that it is detected by the high level sensor in the separation tank. At that point, the accumulated oil flows through pipe 84 to an oil storage tank 120. The oil tank has internal sensors to detect the high oil level and low oil level and these are connected to the computer by wires 122 and 124. When the oil storage tank is full, the recovered oil can be sold and removed by a truck and transported to a processing plant or oil reclaimer for further processing into many useful products. The advanced computer control system incorporates signal means (not shown) for notifying the oil reclaimer when the tank is ready for oil removal.

The water in the lower part of tank 34 is pumped through pipe 78, pump 79, and pipe 74 to the condenser tank 90 where the water is heated or warmed by the condensing s coil 88. The pump 79 is monitored and controlled by wire 76.The heated water is returned to the separation tank 34 by pipe 82 and the temperature is monitored by wire 80 connected to an internal sensor in pipe 82. When the water leaves the separation tank 34 though line 46, it is warm. The water drains though a control valve 42 to a heat recovery tank 48 to allow recovery of the heat in this water. The control valve 42 is opened and closed by means of the control line 44. Heat may be recovered by means of a Rankine cycle heat recovery system or vapor compression refrigeration. The level of the water in the heat recovery tank is controlled by the high level and low level wires 50 and 52 connected to internal sensors and the temperature is monitored by the wire 54 connected to an internal sensor. At the proper time, the water in tank 48 can be removed by pipe 56 and this is controlled by the valve 58 and its control line 60 to the computer.

When additional water is needed it is added by pipe 116 and the flow is controlled by the valve 114. The valve is monitored by the computer in conjunction with wire 112.

The hot water in the heat recovery tank 48 flows through pipe 62, pump 66, and pipe 64 to the evaporator coil 106. The pump 66 is controlled by wire 68. The hot water is returned to the heat recovery tank by means of pipe 70 while the temperature is monitored by means of connection 72 to an internal temperature sensor.

In the evaporator tank 104, a conventional refrigerant such as HCFC-22 or HFC-134a is vaporized and is conducted by pipe 98 to the compressor 102. The compressor is turned off and on by means of the computer and wire 100.

An internal sensor connected to wire 94 monitors the pressure in pipe 98. The vapor is then compressed by compressor 102 and led by pipe 92 to the condenser tank 90. The pressure of the gas in pipe 92 is monitored by wire 96, which is attached to an internal pressure gage. The liquefied refrigerant is then conveyed by pipe 86 to the storage tank 118 for reuse. Thus, heat is transferred to the water in the heat recovery tank 34. The refrigerant is conveyed by pipe 110 to the thermal expansion valve 108 and ultimately to the evaporator tank 104. The cycle continues to extract heat until the preset separation temperature is achieved. Once all heat has been extracted from the water, the water in the heat recovery tank 48 is drained to either the existing sewage system for disposal or is transferred to a holding tank for reuse.

If the water is transferred for reuse, it may be filtered by the fine mesh filter 61 to remove any remaining solids. For the purposes of this invention, a fine filter is one that blocks the passage of particles greater than about 500 mesh or 28 microns. The fine mesh filter rating can be in the range from 300 to 500 mesh. If desired, the water can be treated with chemicals as required to render the water suitable for use in water closets or urinals or for use in irrigation purposes (nonagricultural uses such as lawn watering).

The heart of the apparatus is a complex computer control system that continuously monitors and reports all liquid levels, temperatures, and pressures in the system. The apparatus is then sequenced in a manner to operate continuous batches until no wastewater remains for processing. As shown above, this system consists of level sensors to detect water or oil levels, standard temperature measuring devices such as thermocouples, and standard pressure measuring devices to measure the pressures in the refrigeration system. The system connects to the control computer 125 that utilizes a copyrighted program to start and stop all mechanical devices. Examples of these controlled devices are pumps 13, 68, and 76, compressor 102, and valves such as 28, 42, 58, and 114 that transfer wastewater, cleaned water, and oil to the proper tanks. The computer system also monitors all mechanical parts of the system and signals of any improper operation and required maintenance.

I claim:

1. Apparatus for the recovery of oils from waste streams that contain water, oils, and food solids which comprises the combination of a) a coarse filtration zone for the removal of coarse food solids from a waste stream, b) a separation tank connected to said filtration tank having a temperature range and a residence time period sufficient to produce a layer of oil and a layer of water, c) an oil storage tank connected to said separation tank to receive and store said oil layer, d) a heat recovery tank connected said separation tank to receive and contact said water layer with vapor compression refrigeration whereby said water layer is contacted with vapor compression refrigeration and the extracted heat values are transferred to said separation tank, e) a compressor system for supplying vapor compression refrigeration to said heat recovery tank.

2. The apparatus of claim 1 wherein said combination includes a fine filtration zone whereby said heat recovery water layer is treated to make it suitable for reuse.

3. The apparatus of claim 1 wherein said compressor system includes a refrigerant compressor connected to a refrigerant tank and a heat exchanger for extracting heat from said heat recovery tank, and a heat exchanger for adding heat to said separation tank.

4. Apparatus for the recovery of oils from waste streams that contain water, oils, and food solids which comprises the combination of
   a) a coarse filtration zone for the removal of coarse food solids from a waste stream,
   b) a separation tank in series with said filtration zone having a temperature range and a residence time period sufficient to produce a layer of oil and a layer of water,
   c) an oil storage tank connected to said separation tank to receive and store said oil layer,
   d) a heat recovery tank connected to said separation tank to receive and contact said water layer with vapor compression refrigeration whereby said water layer is contacted with vapor compression refrigeration and the extracted heat values are transferred to said separation tank,
   e) a compressor system for supplying vapor compression refrigeration to said heat recovery tank.

\* \* \* \* \*